United States Patent
Ho et al.

(10) Patent No.: US 10,546,247 B2
(45) Date of Patent: Jan. 28, 2020

(54) SWITCHING LEADER-ENDORSER FOR CLASSIFIER DECISION COMBINATION

(71) Applicant: International Business Machines Corporation, Armonk, NY (US)

(72) Inventors: Tin Kam Ho, Millburn, NJ (US); Luis A. Lastras-Montano, Cortlandt Manor, NY (US); Vinith Misra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 14/955,547

(22) Filed: Dec. 1, 2015

(65) Prior Publication Data

US 2017/0154281 A1    Jun. 1, 2017

(51) Int. Cl.
*G06N 20/00*    (2019.01)

(52) U.S. Cl.
CPC .................................. *G06N 20/00* (2019.01)

(58) Field of Classification Search
CPC .... G06N 3/0454; G06N 99/0005; G06N 5/04; G06F 17/3013; G06F 17/30598
See application file for complete search history.

(56) References Cited

U.S. PATENT DOCUMENTS

| 7,725,414 B2 | 5/2010 | Nigam et al. |
| 8,473,499 B2 | 6/2013 | Song et al. |
| 2005/0131873 A1* | 6/2005 | Fan ..................... G06F 16/2465 |
| 2014/0272885 A1 | 9/2014 | Allen et al. |

OTHER PUBLICATIONS

Ho, Adaptive Coordination of Multiple Classifiers, World Scientific, Document Analysis Systems II at pp. 371-384 (1998) (Year: 1998).*
Avnimelech & Intrator, Boosted Mixture of Experts: An Ensemble Learning Scheme, Neural Computation 11 at 475-490 (1999) (Year: 1999).*
Wozniak et al., A Survey of Multiple Classifier Systems as Hybrid Systems, Information Fusion 16 at 3-17 (2014) (Year: 2014).*
Chu-Carroll et al., In Question Answering, Two Heads Are Better Than One, Proc. of HLT-NAACL (2003) at pp. 24-31 (Year: 2003).*

(Continued)

*Primary Examiner* — Robert A Cassity
*Assistant Examiner* — Marshall L Werner
(74) *Attorney, Agent, or Firm* — VanLeeuwen & VanLeeuwen; William J. Stock

(57) ABSTRACT

An approach is provided in which an information handling system trains multiple classifiers using a set of training samples. The information handling system selects a leader classifier from the multiple classifiers that generates the most amount of correct decisions corresponding to the set of training samples. Next, the information handling system identifies an endorser classifier from the multiple classifiers that generates the highest proportion of correct decisions among the endorser classifier's decisions matching the leader classifier's decisions, and combines the leader classifier and the endorser classifier into a combined classifier stage. In turn, the information handling system utilizes the combined classifier stage to process inquiries and generate results.

16 Claims, 7 Drawing Sheets

(56) References Cited

OTHER PUBLICATIONS

Gunter, Multiple Classifier Systems in Offline Cursive Handwriting Recognition, PhD thesis, Institute of Computer Science and Applied Mathematics (2004) available at Internet <https://pdfs.semanticscholar.org/6411/0393df61569928a5b552ad6403c1aaa327c5.pdf> at p. 1-6 (2004) (Year: 2004).*

Rahman & Fairhust, Serial Combination of Multiple Experts: A Unified Evaluation, Pattern Analysis & Applications vol. 2 (1999) at 292-311 (Year: 1999).*

Ho et al., Adaptive Coordination of Multiple Classifiers, World Scientific, Document Analysis Systems II at pp. 371-384, 1998. (Year: 1998).*

Vriesmann et al., Combining Overall and Local Class Accuracies in an Oracle-based Method for Dynamic Ensemble Selection, Int'l Joint Conference on Neural Networks, Jul. 2015. (Year: 2015).*

Avnimelech et al., Boosted Mixture of Experts: An Ensemble Learning Scheme, Neural Computation 11 at pp. 475-490, 1999. (Year : 1999).*

Chu-Carroll et al., In Question Answering, Two Heads Are Better Than One, Proc. of HLT-NAACL (2003) at pp. 24-31, 2003. (Year: 2003).*

Wozniak et al., A Survey of Multiple Classifier Systems as Hybrid Systems, Information Fusion 16 at pp. 3-17, 2014. (Year: 2014).*

Rahman et al., Serial Combination of Multiple Experts: A Unified Evaluation, Pattern Analysis & Applications vol. 2 (1999) at 292-311, 1999. (Year: 1999).*

Ho et al., "Decision Combination in Multiple Classifier Systems," IEEE Transactions on Pattern Analysis and Machine Intelligence, vol. 16, Issue: 1, Jan. 1994, pp. 66-75.

Giacinto et al., "Methods for Dynamic Classifier Selection," International Conference on Image Analysis and Processing (ICIAP 1999), Sep. 1999, Venice, Italy, pp. 659-664.

Santana et al., "A Dynamic Classifier Selection Method to Build Ensembles using Accuracy and Diversity," Ninth Brazilian Symposium on Neural Networks, Oct. 2006, Ribeirao Preto, Brazil, pp. 36-41.

Ko et al., "From dynamic classifier selection to dynamic ensemble selection," Pattern Recognition, vol. 41, Issue 5, May 2008, pp. 1718-1731.

* cited by examiner

SWITCHING LEADER-ENDORSER FOR CLASSIFIER DECISION COMBINATION

BACKGROUND

The present disclosure relates to creating combined classifier stages that leverage strengths from individual classifiers to improve overall decision-making accuracy of an inquiry.

A classifier is an algorithm for deciding, for an input case, to which one class among multiple candidate classes the input case belongs. Depending on the application context, the input case can be a piece of text, an image, a sound sequence, a set of numbers, or any other representation of a piece of information, an object, an action, or an event.

Question answer systems typically employ classifiers into a pipeline to identify candidate answers from a knowledge base. Prior to using a question answer system to answer questions, system developers proceed through a process of selecting classifiers that are best suited to include in the question answer system's pipeline. During this process, system developers train the classifiers against a set of training samples, such as by training linear regression models in the classifiers. The classifiers that produce the most amount of correct decisions relative to the training samples are typically included into the question answer system's pipeline for subsequent use.

BRIEF SUMMARY

According to one embodiment of the present disclosure, an approach is provided in which an information handling system trains multiple classifiers using a set of training samples. The information handling system selects a leader classifier from the multiple classifiers that generates the most amount of correct decisions corresponding to the set of training samples. Next, the information handling system identifies an endorser classifier from the multiple classifiers that generates a highest proportion of correct decisions among the endorser classifier's decisions matching the leader classifier's decisions, and combines the leader classifier and the endorser classifier into a combined classifier stage. In turn, the information handling system utilizes the combined classifier stage to process inquiries and generate results.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
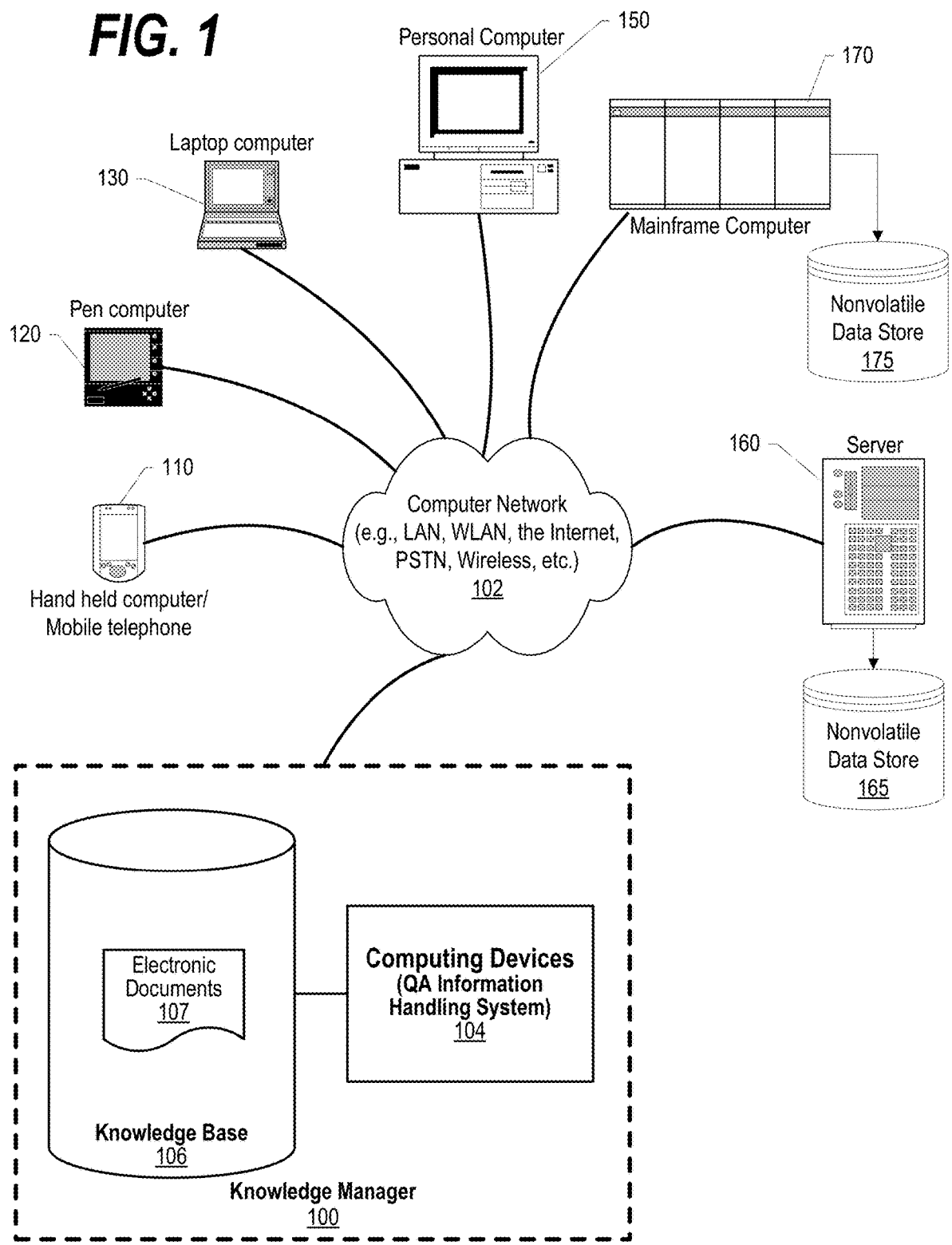
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
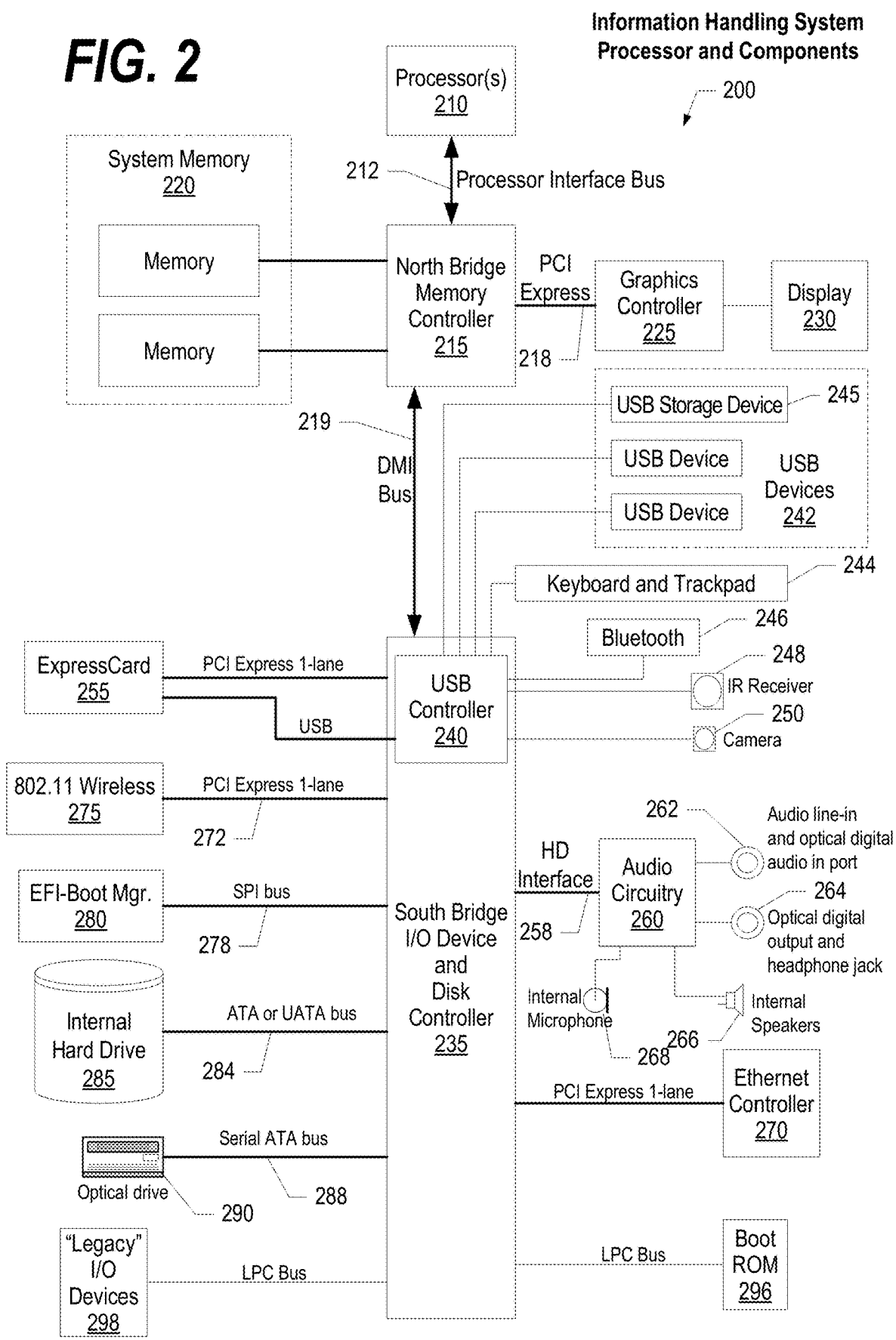
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212.

Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 9 depict an approach that can be executed on an information handling system. The information handling system recursively trains classifiers to select leader classifiers and corresponding endorser classifiers to include in combined classifier stages, which may be utilized in any application context where a classifier is employed. For example, the combined classifier stages may be used in a question answer system to increase the accuracy of decisions to questions by using the leader classifier to answer a question while reducing areas of weakness of the leader classifier by requiring the endorser classifier to produce a matching decision. As those skilled in the art will appreciate, the approach described herein may also be adapted to other application contexts utilizing classifiers such as image recognition, speech recognition, and any other problems that require a decision on one of many possibilities.

Figure 3:
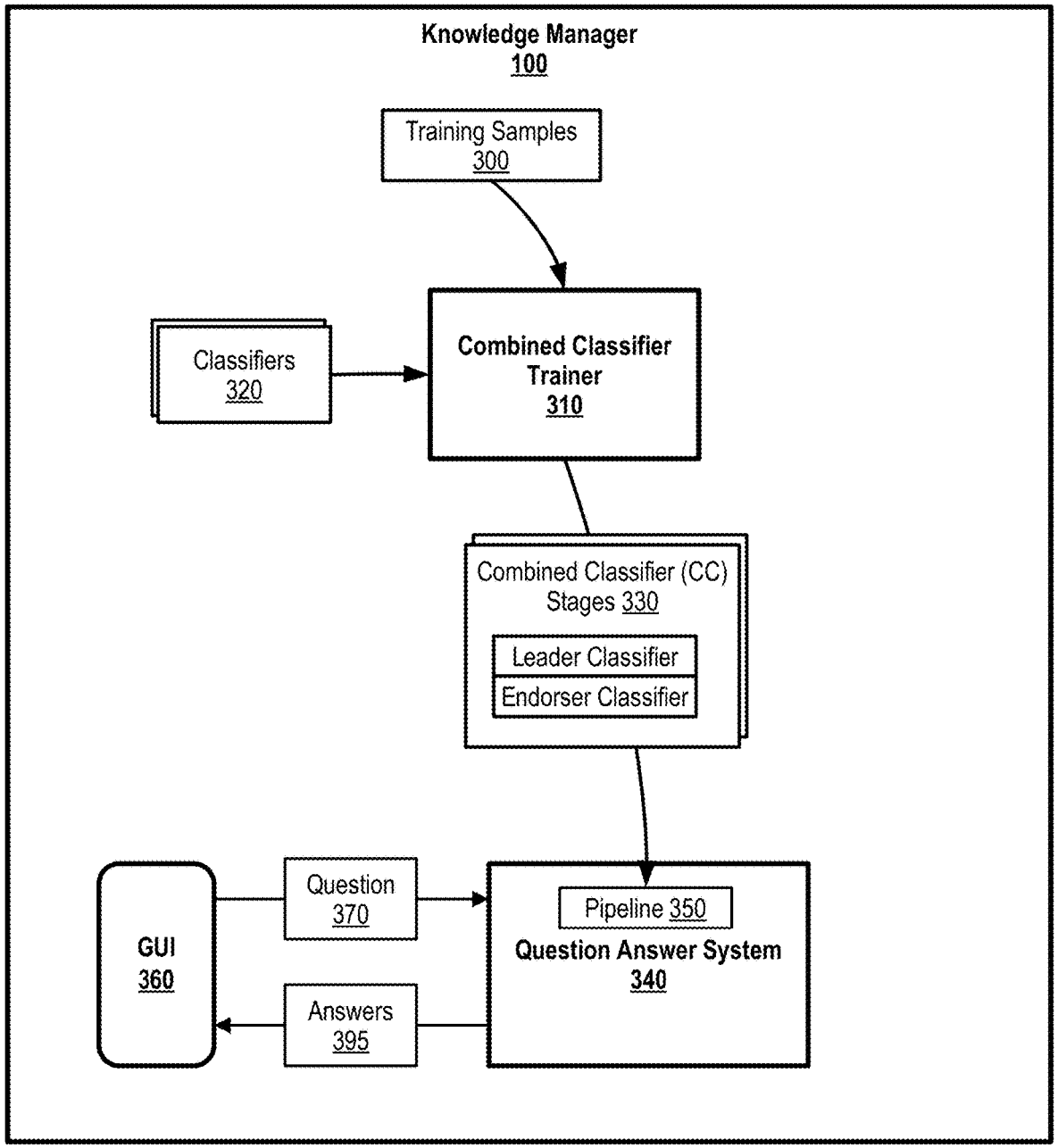
FIG. 3 is an exemplary diagram depicting a knowledge manager generating combined classifier stages that are subsequently used in a question answer system pipeline.

FIG. 3 is an exemplary diagram depicting a knowledge manager generating combined classifier stages that are subsequently used in a question answer system pipeline. Knowledge manager 100 includes combined classifier trainer 310, which uses training samples to determine best combinations of classifiers 320 to utilize in pipeline 350.

Combined classifier trainer 310 recursively analyzes classifiers 320 and training samples 300 in stages. For each stage, combined classifier trainer 310 identifies a leader classifier and an endorser classifier. The leader classifier is the classifier that produces the most amount of correct decisions for a given set of training samples, and the endorser classifier is the classifier that produces the highest percentage of decisions matching the leader classifier's decisions that are correct relative to the amount of decisions matching the leader classifier's decision, referred to herein as an accuracy of matching decisions.

In one embodiment, a decision is an output that assigns a class to an input. For example, a classifier that agrees with 10 of the leader's decisions, of which 8 of the 10 decisions are correct (80% accuracy of matching decisions) is chosen as the endorser classifier over another classifier that agrees with 100 of the leader's decisions but only 50 of the agreed upon decisions are correct (50% accuracy of matching decisions). In another embodiment, a decision may be a numerical decision such as numerical predictions. For example, a question may be "How many people are do you think may come to tomorrow's event?" and the decision is a numerical value.

In addition, to benefit the leader classifier, the endorser classifier's accuracy of matching decisions value should be higher than the accuracy of the leader classifier's decisions relative to the set of training samples. For example, if the leader classifier produced 700/1,000 correct decisions (70% accurate), then the classifier with the highest accuracy of matching decisions value is chosen as the endorser classifier if its accuracy of matching decisions value is greater than 70% (see FIGS. 6, 7, and corresponding text for further details).

Combined classifier trainer 310 combines the selected leader classifier and endorser classifier into a combined classifier stage 330, which is stored in pipeline 350 for subsequent use. In addition, combined classifier trainer 310 commits the training samples corresponding to the agreed upon decisions (both correct and incorrect) to the particular stage. For example, if the leader classifier and endorser classifier agree on 500 decisions, 400 of which are correct and 100 of which are incorrect, combined classifier trainer 310 commits the 500 agreed upon decisions to the combined classifier stage.

For the next evaluation stage, combined classifier trainer 310 evaluates classifiers 320 against the remaining training samples 300. For example, if training samples 300 starts with 2,000 samples and 500 are committed to the first stage, combined classifier trainer 300 uses the 1,500 remaining training samples to evaluate classifiers 320 in the second stage (see FIG. 4 and corresponding text for further details).

Combined classifier trainer 310 continues to add combined classifier stages to pipeline 350 until combined classifier trainer 310 determines that an endorser classifier's decisions does not add benefit to a leader classifier's decisions. For example, if the leader classifier has an 80% correct decision accuracy and the endorser classifier has a 50% accuracy of matching decisions, then the endorser classifier does not add benefit to the leader classifier. At this point, combined classifier trainer 310 commits the remaining set of training samples to the leader classifier selected for the stage.

As such, in one embodiment, question answer system 340 uses pipeline 350 to process question 370 that is received from GUI 360. Question answer system 340, in turn, generates answers 395, which are answers based upon the strengths of the leader classifiers that are validated by the endorser classifiers.

In another embodiment, to avoid fine-tuning pipeline 350 to an extremely small number of cases, combined classifier trainer 310 may require that a leader-endorser pair be employed only if the pair agree on a sufficient number of training samples. In this embodiment, combined classifier trainer 310 may determine a required minimum amount of matching decisions and default to using only the leader classifier if a combined classifier pair does not agree on the minimum amount of matching decisions.

In another embodiment, more aggressive detection of the leader classifier's errors can be made by requiring multiple endorser classifiers for each decision. In yet another embodiment, a component classifier may be an ensemble of multiple classifiers because combined classifier trainer 310 does not depend on having confidence scores on a comparable scale. As such, combined classifier trainer 310 it is suited to combine decision makers of many different types.

Figure 4:
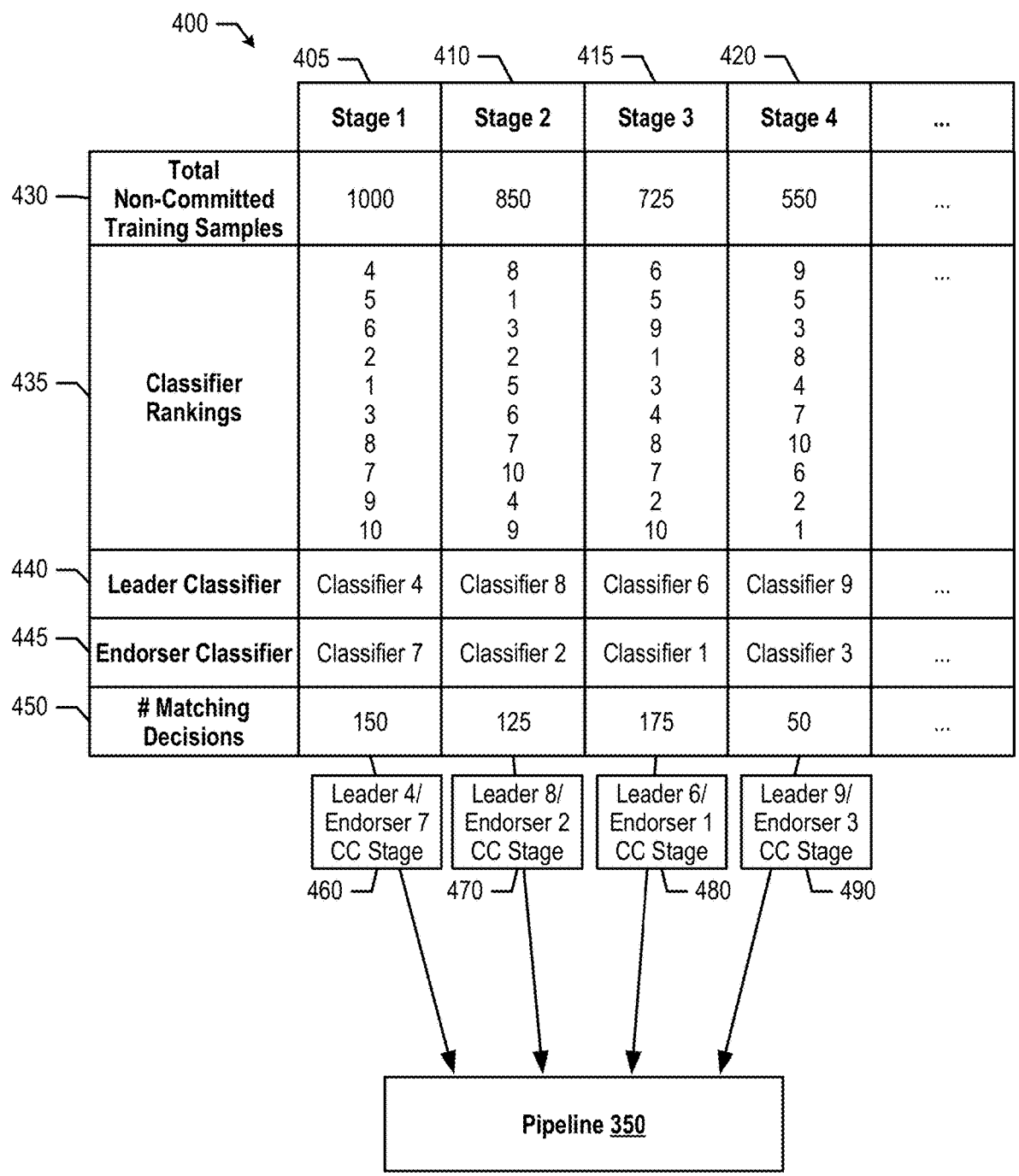
FIG. 4 is an exemplary diagram depicting details pertaining to leader classifier selection and corresponding endorser classifier selection.

In yet another embodiment, combined classifier trainer 310 may operate in a regression context where decisions are not categorical but are numerical responses. In this embodiment, matching decisions between those of the leader and those of the candidate endorsers can be defined as those predictions differing within a certain threshold, according to a specific definition of differences (e.g. mean squared error). An endorser classifier is selected from multiple candidate endorsers based upon a decision reliability value for their matching responses. In this embodiment, combined classifier trainer 310 substitutes the accuracy estimate of matching decisions with a suitable measure of a decision's reliability (e.g. mean squared error with respect to the truth) as learned from history, referred to herein as a decision reliability value. FIG. 4 is an exemplary diagram depicting details pertaining to leader classifier selection and corresponding endorser classifier selection. Diagram 400 shows an example of training a pipeline through four stages, which are shown in columns 405, 410, 415, and 420.

For each stage, the knowledge manager uses a number of training samples in a training set (shown in row 430), which decrease as training samples are committed to various stages. Row 435 shows a ranking of classifiers based upon the training samples. For example, for stage 1 405, the classifiers were trained on 1,000 samples and classifier 4 had the most amount of correct decisions, followed by classifier 5, then classifier 6, and so on. As such, row 440 shows that classifier 4 is selected as the leader classifier.

Figure 7:
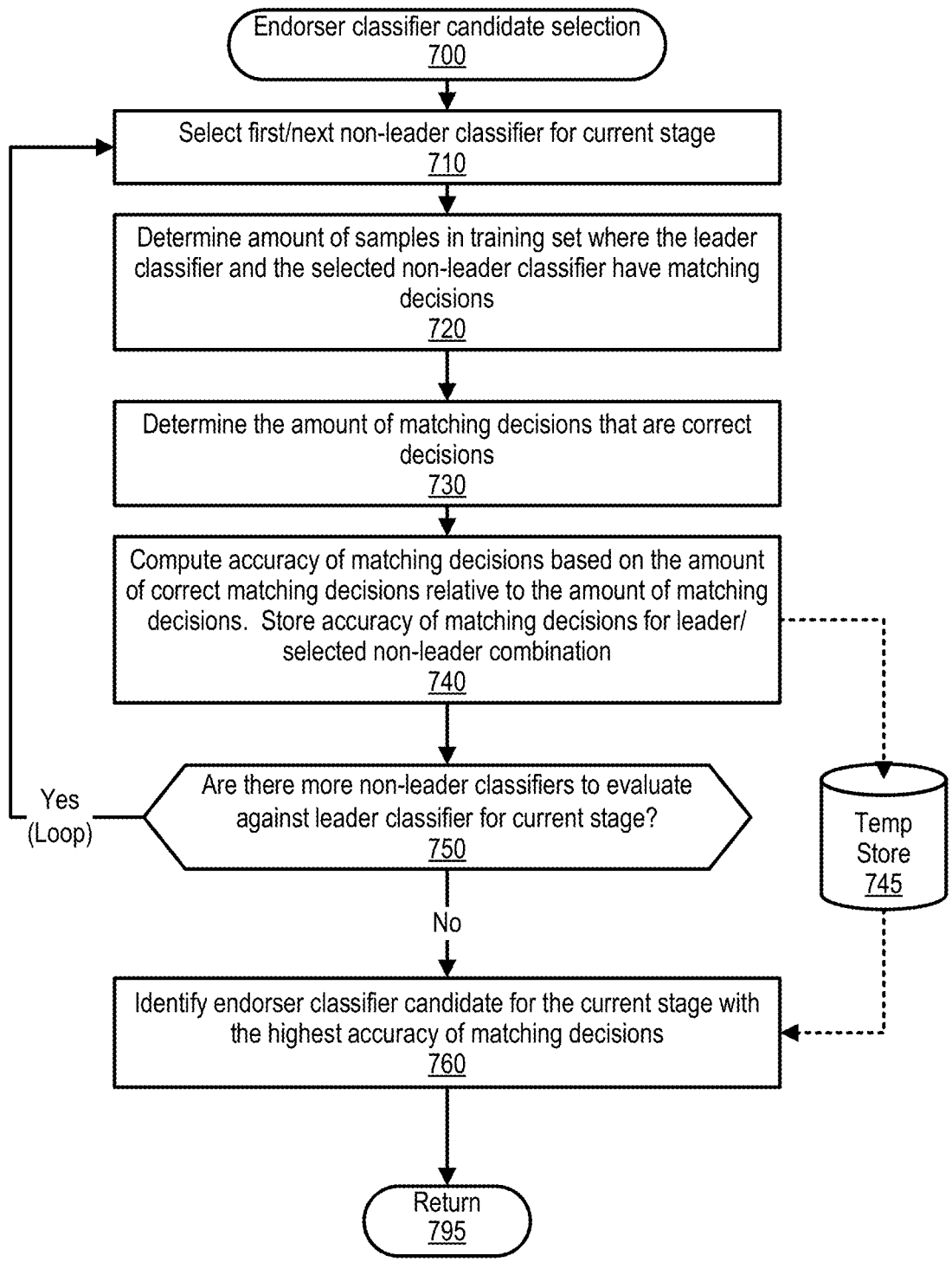
FIG. 7 is an exemplary flowchart depicting steps taken to select an endorser classifier to combine with a leader classifier into a combined classifier stage.

Row 445 shows the classifier that is determined to be the endorser classifier of the leader classifier. The endorser classifier, as discussed herein, is the non-leader classifier that has the highest accuracy of matching decisions value that is also higher than the accuracy of the leader classifier when deciding alone. Row 445 shows that classifier 7 is chosen as the endorser classifier to classifier 4. Steps to selecting an endorser classifier are not shown in FIG. 4 for simplicity purposes, but are depicted in FIG. 7 in detail.

Row 450 shows the number of matching decisions between classifier 4 and classifier 7. Note that the number of matching decisions does not necessarily mean that all of the matching decisions are correct, but rather the two classifiers agree on a decision for 150 of the 1,000 samples. As such, the knowledge manager combines classifier 4 and classifier 7 into combined classifier stage 460 for pipeline 350, and commits the 150 samples corresponding to the matching decisions to combined classifier stage 460.

During stage 2 (column 410), the training set includes 850 samples (1,000–150), upon which each of the classifiers train. Row 435 shows that classifier 8 has the most amount of correct decisions for the 850 sample training stage. As such, row 440 shows that classifier 8 is chosen as the leader classifier for stage 2. The knowledge manager evaluates the non-leader classifiers against classifier 8 and determines that classifier 2 has the largest proportion of correct decisions among those matching classifier 8's decisions (shown in row 445), and that the proportion is larger than the proportion of correct decisions produced by the leader alone. Row 450 shows that classifier 8 and classifier 2 have 125 matching decisions out of the 850 training samples. As such, the knowledge manager combines classifier 8 and classifier 2 into combined classifier stage 470 for pipeline 350, and commits the 125 samples corresponding to the matching decisions to combined classifier stage 470.

During stage 3 (column 415), the training set includes 725 samples (850–125), upon which each of the classifiers train. Row 435 shows that classifier 6 has the most amount of correct decisions for the 725 samples in the training stage. As such, row 440 shows that classifier 6 is chosen as the leader classifier for stage 3. The knowledge manager evaluates the non-leader classifiers against classifier 6 and determines that classifier 1 has the largest proportion of correct decisions among those agreeing with those by classifier 6 (shown in row 445), and that the proportion is larger than the proportion of correct decisions by the leader alone. Row 450 shows that classifier 6 and classifier 1 have 175 matching decisions out of the 775 training samples. As such, the knowledge manager combines classifier 6 and classifier 1 into combined classifier stage 480 for pipeline 350, and commits the samples corresponding to the matching decisions to combined classifier stage 480.

During stage 4 (column 420), the training set includes 550 samples (725–175), upon which each of the classifiers train. Row 435 shows that classifier 9 has the most amount of correct decisions for the 550 sample training stage. As such, row 440 shows that classifier 9 is chosen as the leader classifier for stage 4. The knowledge manager evaluates the non-leader classifiers against classifier 9 and determines that classifier 3 has the largest proportion of correct decisions among those agreeing with those by classifier 9 (shown in row 445), and that the proportion is larger than the proportion of correct decisions by the leader alone. Row 450 shows that classifier 9 and classifier 3 have 50 matching decisions out of the 550 training samples. As such, the knowledge manager combines classifier 9 and classifier 3 into combined classifier stage 490 for pipeline 350, and commits the 50 samples corresponding to the matching decisions to combined classifier stage 490.

The knowledge manager continues to recursively evaluate classifiers against training samples until a selected leader classifier does not benefit from being combined with an endorser classifier, at which point the knowledge manager commits the selected leader classifier to the remaining training samples and stores in pipeline 350.

Figure 5:
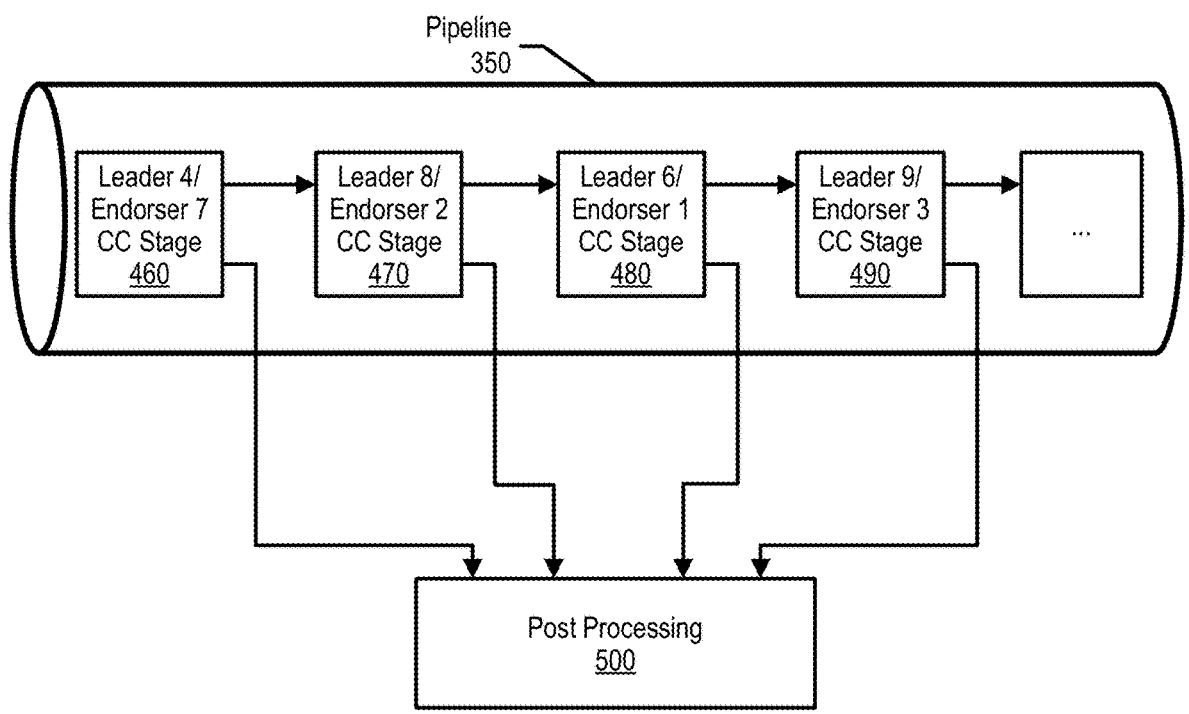
FIG. 5 is an exemplary diagram depicting combined classifier stages utilized in a question answer system's pipeline.

FIG. 5 is an exemplary diagram depicting combined classifier stages utilized in a question answer system's pipeline. Pipeline 350 includes combined classifier stages 460, 470, 480, and 490 shown in FIG. 4. Each stage is configured such that if a decision is agreed upon by both the leader classifier and the endorser classifier, the pipeline is exited and proceeds to post processing 500, which may include steps such as candidate ranking, answer scoring, etc.

In one embodiment, if combined classifier stage 460 determines an agreed upon answer for a question, processing exits pipeline 350 after combined classifier stage 460. However, if the leader and endorser classifiers at combined classifier stage 460 do not agree on any answer, processing advances to combined classifier stage 470. Similarly, if combined classifier stage 470 answers the question, then the knowledge manager exits the pipeline afterwards. However, if combined classifier 470 does not answer the question, the knowledge manager advances to combined classifier stage 480. In this embodiment, the knowledge manager proceeds through pipeline 350 until a correct answer, or a set of candidate answers, are determined.

Figure 6:
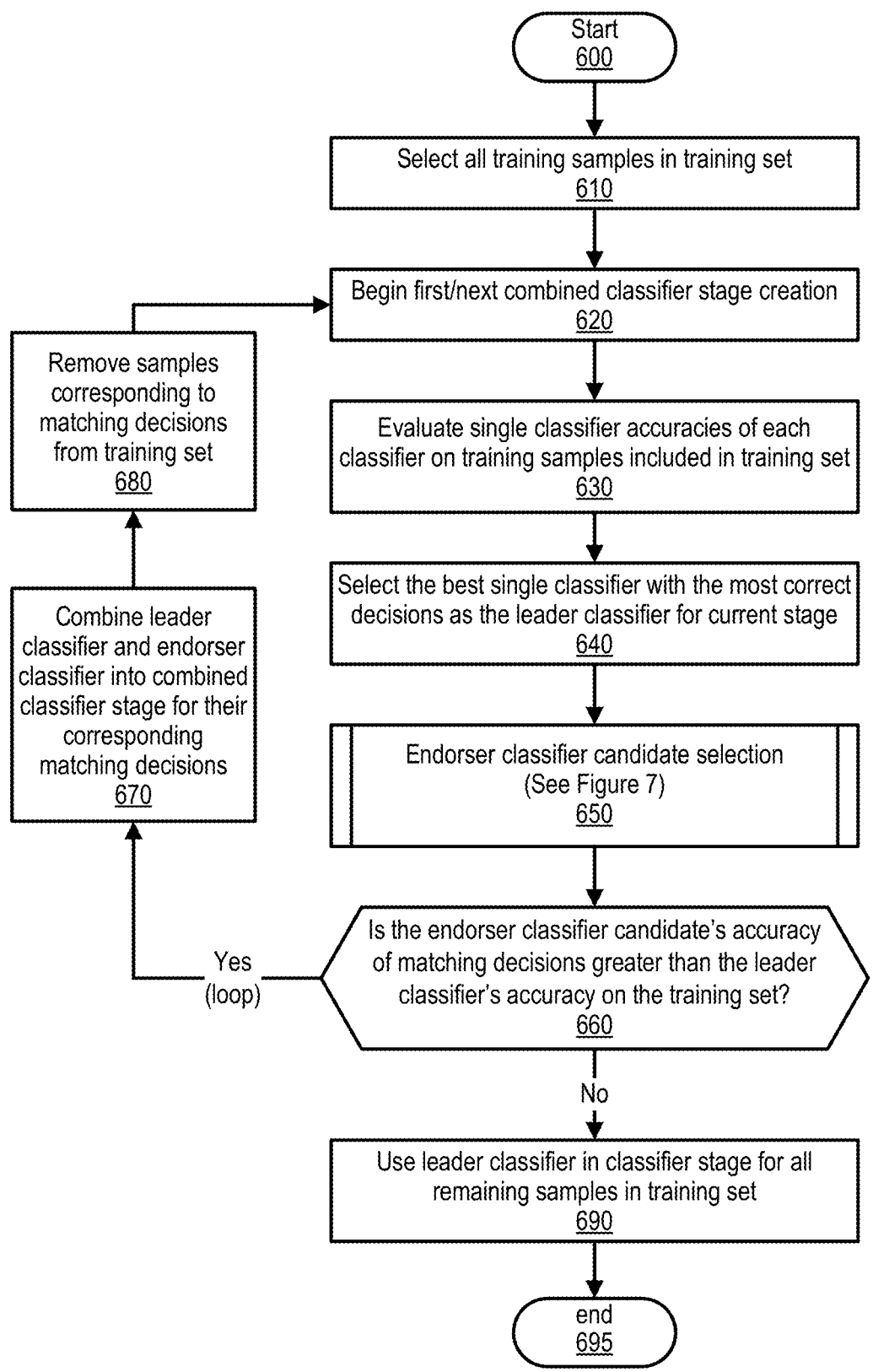
FIG. 6 is an exemplary flowchart depicting steps taken to create combined classifier stages that each include a leader classifier and an endorser classifier.

FIG. 6 is an exemplary flowchart depicting steps taken to create combined classifier stages that each includes a leader classifier and an endorser classifier. FIG. 6 processing commences at 600 whereupon, at step 610, the process selects all training samples in a training set. For example, a training set may include 1,000 training samples, each including a question and answer.

At step 620, the process initiates a first combined classifier stage. At step 630, for each classifier, the process evaluates their single classifier accuracies on the training samples included in the training set. For example, the first pass through, the process uses the 1,000 training samples to determine each classifier's accuracy, but the second pass through, the process uses the training samples from the training set that were not committed to the first combined classifier stage (see FIG. 4 and corresponding text for further details).

At step 640, the process selects the best single classifier with the most amount of correct decisions as the leader classifier for the current stage. Referring to FIG. 4, classifier 4 had the most amount of correct decisions in the first stage. At predefined process 650, the process evaluates the other non-leader classifiers against the selected leader classifier to determine an endorser classifier candidate that has the highest accuracy of matching decisions value (see FIG. 7 and corresponding text for processing details).

The process determines as to whether the endorser classifier candidate's accuracy of matching decisions value is greater than the leader classifier's accuracy value on the current training set (decision 660). For example, if the endorser classifier candidate's accuracy of matching decisions value is 90% and the leader classifier's accuracy value on the current set of training samples is 80%, then combining the endorser classifier with the leader classifier is beneficial.

If the endorser classifier candidate's accuracy of matching decisions value is greater than the leader classifier's accuracy value on the current training set, then decision 660 branches to the 'yes' branch. At step 670, the process combines the leader classifier and the endorser classifier candidate, now deemed an endorser classifier, into a combined classifier stage for their corresponding matching decisions, which include correct and incorrect decisions. Using the example above, assuming that the endorser classifier agrees with another 50 decisions by the leader classifier that are incorrect, the process commits training samples from the 450 agreed upon correct decisions plus the 50 agreed upon incorrect decisions (500 total) to the combined classifier stage.

At step 680, the process removes samples from the training set corresponding to the matching decisions. Referring to FIG. 4, the second pass uses 850 total training samples because classifier 4 and classifier 7 matched on 150 decisions. Note that although 150 decisions from classifier 4 and classifier 7 matched, a portion of the matching decisions may have been correct decisions, such as 125 of the 150 matching decisions were actually correct decisions as discussed in the above example.

This looping continues until the endorser classifier candidate's accuracy of matching decisions value is not greater than the leader classifier's accuracy value on the current training set, at which point decision 660 branches to the 'no' branch exiting the loop. At this moment, the leader classifier is better equipped to provide a correct decision relating to the remaining training samples and combining an endorser classifier to the leader classifier does not increase the accuracy of the classifier stage. As such, at step 690, the process uses the leader classifier in the final classifier stage for all of the remaining samples in the training set. FIG. 6 processing thereafter ends at 695.

FIG. 7 is an exemplary flowchart depicting steps taken to select an endorser classifier to combine with a leader classifier into a combined classifier stage. A leader classifier was chosen in step 640 of FIG. 6 that produced the most amount of correct decisions for a given set of training samples. The steps shown in FIG. 7 select an endorser classifier for the selected leader classifier.

FIG. 7 processing commences at 700 whereupon, at step 710, the process selects a first non-leader classifier to compare against the leader classifier for the current stage. At step 720, the process determines the amount of samples in the training set where the non-leader classifier's decisions match the leader classifier's decisions. At step 730, the process identifies the amount of the matching decisions that are correct decisions based upon the training samples. At step 740, the process computes an accuracy of matching decisions value based on the amount of correct matching decisions relative to the amount of matching decisions. For example, the process may determine that the leader classifier and selected non-leader classifier agree on 100 samples, but only 80 of the 100 samples are correct decisions. As such, the process computes an accuracy of matching decisions value of 80% (80/100) and stores the accuracy of matching decisions value for the leader/selected non-leader combination in temporary store 745.

The process determines as to whether are there more non-leader classifiers to evaluate against the leader classifier for the current stage (decision 750). If there are there more non-leader classifiers to evaluate against the leader classifier, then decision 750 branches to the 'yes' branch which loops back to select the next non-leader classifier and compare the selected non-leader classifier's decisions against the leader classifier's decisions. This looping continues until there are no more non-leader classifiers to evaluate against the leader classifier, at which point decision 750 branches to the 'no' branch exiting the loop.

At step 760, the process identifies an endorser classifier candidate with the highest accuracy of matching decisions value. As discussed in FIG. 6, if the endorser classifier candidate's accuracy of matching decisions value is higher than the leader classifier's accuracy when acting alone, the process selects the endorser classifier candidate as the endorser classifier of the leader classifier for the current stage (see steps 660-670 and corresponding text for further details).

In one embodiment, as discussed earlier, the process may require that a leader-endorser pair be employed only if the pair agree on a sufficient number of training samples. In this embodiment, the process may determine a required minimum amount of matching decisions and default to using only the leader classifier if a combined classifier pair does not agree on the minimum amount of matching decisions. In another embodiment, the process may add multiple endorser classifiers to a classifier combination in order to have a more aggressive detection of the leader classifier's errors. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   training a plurality of classifiers based upon a set of training samples;
   in response to the training, identifying a leader classifier that generates a first set of decisions comprising a most amount of correct decisions out of the plurality of classifiers;
   for each of a selected one of the plurality of classifiers less the leader classifier:
      generating a second set of decisions by the selected classifier during the training;
      determining, from the second set of decisions, an amount of matching decisions that match the first set of decisions generated by the leader classifier;
      identifying, from the matching decisions, an amount of matching correct decisions; and
      computing an accuracy of matching decisions value by dividing the amount of matching correct decisions by the amount of matching decisions;
   selecting, from the plurality of classifiers, an endorser classifier that has the highest accuracy of matching decisions value;
   storing the leader classifier and the endorser classifier as a combined classifier stage into a pipeline;
   removing a portion of the training samples from the set of training samples that correspond to the matching decisions, resulting in a subset of training samples;
   retraining all of the plurality of classifiers on the subset of training samples in response to removing the portion of the training samples from the set of training samples corresponding to the matching decisions;
   in response to retraining each of the plurality of classifiers on the subset of training samples, selecting a subsequent leader classifier and a subsequent endorser classifier as a subsequent combined classifier stage;
   storing the subsequent combined classifier stage into the pipeline at a stage subsequent to the combined classifier stage; and
   using the pipeline to generate one or more answers to a natural language question in a question answer system.

2. The method of claim 1 further comprising:
   computing a leader classifier accuracy value by dividing the most amount of correct decisions in the first set of decisions by an amount of training samples in the set of training samples; and
   combining the leader classifier with the endorser classifier into the combined classifier stage in response to determining that the endorser classifier's accuracy of matching decisions value is higher than the leader classifier accuracy value.

3. The method of claim 1 further comprising:
   wherein the subsequent leader classifier generates a set of third decisions having a most amount of subsequent correct decisions; and
   selecting the subsequent endorser classifier that generates a set of fourth decisions that match one or more of the third decisions, resulting in a set of subsequent matching decisions, wherein the selection of the endorser classifier is based upon comparing a total amount of the subsequent matching decisions against an amount of the subsequent matching decisions that are correct.

4. The method of claim 3 further comprising:
processing the inquiry using the combined classifier stage;
in response to the leader classifier and the endorser classifier generating one or more same decisions to the inquiry:
  exiting the pipeline; and
  providing the one or more same decisions as the one or more results to the inquiry; and
in response to the leader classifier and the endorser classifier not generating at least one same decision to the inquiry, processing the inquiry by the subsequent combined classifier stage.

5. The method of claim 3 further comprising:
in response to determining that the subsequent accuracy of matching decisions value is not greater than the subsequent leader classifier accuracy value, storing the subsequent leader classifier without the subsequent endorser classifier into the pipeline.

6. The method of claim 1 further comprising:
combining the leader classifier with the endorser classifier into the combined classifier stage in response to determining that the amount of matching decisions meets a required minimum amount of matching decisions.

7. The method of claim 1 further comprising:
adding a different endorser classifier with the endorser classifier and the leader classifier to the combined classifier stage, wherein at least one of the one or more answers are based upon the leader classifier, the endorser classifier, and the different endorser classifier agreeing on the at least one answer.

8. The method of claim 1 wherein the information handling system operates in a regression context, the method further comprising:
  determining the amount of matching decisions based on one or more numerical response differences between the leader classifier and the endorser classifier, wherein the selection of the endorser classifier is based on a decision reliability value of the matching decisions; and
  wherein the combined classifier stage generates one or more numerical responses to the inquiry in the regression context.

9. An information handling system comprising:
one or more processors;
a memory coupled to at least one of the processors; and
a set of computer program instructions stored in the memory and executed by at least one of the processors in order to perform actions of:
  training a plurality of classifiers based upon a set of training samples;
  in response to the training, identifying a leader classifier that generates a first set of decisions comprising a most amount of correct decisions out of the plurality of classifiers;
  for each of a selected one of the plurality of classifiers less the leader classifier:
    generating a second set of decisions by the selected classifier during the training;
    determining, from the second set of decisions, an amount of matching decisions that match the first set of decisions generated by the leader classifier;
    identifying, from the matching decisions, an amount of matching correct decisions; and
    computing an accuracy of matching decisions value by dividing the amount of matching correct decisions by the amount of matching decisions;
  selecting, from the plurality of classifiers, an endorser classifier that has the highest accuracy of matching decisions value;
  storing the leader classifier and the endorser classifier as a combined classifier stage into a pipeline;
  removing a portion of the training samples from the set of training samples that correspond to the matching decisions, resulting in a subset of training samples;
  retraining all of the plurality of classifiers on the subset of training samples in response to removing the portion of the training samples from the set of training samples corresponding to the matching decisions;
  in response to retraining each of the plurality of classifiers on the subset of training samples, selecting a subsequent leader classifier and a subsequent endorser classifier as a subsequent combined classifier stage;
  storing the subsequent combined classifier stage into the pipeline at a stage subsequent to the combined classifier stage; and
  using the pipeline to generate one or more answers to a natural language question in a question answer system.

10. The information handling system of claim 9 wherein at least one of the one or more processors perform additional actions comprising:
  computing a leader classifier accuracy value by dividing the most amount of correct decisions in the first set of decisions by an amount of training samples in the set of training samples; and
  combining the leader classifier with the endorser classifier into the combined classifier stage in response to determining that the endorser classifier's accuracy of matching decisions value is higher than the leader classifier accuracy value.

11. The information handling system of claim 9 wherein at least one of the one or more processors perform additional actions comprising:
  wherein the subsequent leader classifier generates a set of third decisions having a most amount of subsequent correct decisions; and
  selecting the subsequent endorser classifier that generates a set of fourth decisions that match one or more of the third decisions, resulting in a set of subsequent matching decisions, wherein the selection of the endorser classifier is based upon comparing a total amount of the subsequent matching decisions against an amount of the subsequent matching decisions that are correct.

12. The information handling system of claim 11 wherein at least one of the one or more processors perform additional actions comprising:
  processing the inquiry using the combined classifier stage;
  in response to the leader classifier and the endorser classifier generating one or more same decisions to the inquiry, exiting the pipeline; and
  providing the one or more same decisions as the one or more results to the inquiry.

13. A computer program product stored in a computer readable storage medium, comprising computer program code that, when executed by an information handling system, causes the information handling system to perform actions comprising:
  training a plurality of classifiers based upon a set of training samples;

in response to the training, identifying a leader classifier that generates a first set of decisions comprising a most amount of correct decisions out of the plurality of classifiers;

for each of a selected one of the plurality of classifiers less the leader classifier:
- generating a second set of decisions by the selected classifier during the training;
- determining, from the second set of decisions, an amount of matching decisions that match the first set of decisions generated by the leader classifier;
- identifying, from the matching decisions, an amount of matching correct decisions; and
- computing an accuracy of matching decisions value by dividing the amount of matching correct decisions by the amount of matching decisions;

selecting, from the plurality of classifiers, an endorser classifier that has the highest accuracy of matching decisions value;

storing the leader classifier and the endorser classifier as a combined classifier stage into a pipeline;

removing a portion of the training samples from the set of training samples that correspond to the matching decisions, resulting in a subset of training samples;

retraining all of the plurality of classifiers on the subset of training samples in response to removing the portion of the training samples from the set of training samples corresponding to the matching decisions;

in response to retraining each of the plurality of classifiers on the subset of training samples, selecting a subsequent leader classifier and a subsequent endorser classifier as a subsequent combined classifier stage;

storing the subsequent combined classifier stage into the pipeline at a stage subsequent to the combined classifier stage; and using the pipeline to generate one or more answers to a natural language question in a question answer system.

14. The computer program product of claim 13 wherein the information handling system performs additional actions comprising:
- computing a leader classifier accuracy value by dividing the most amount of correct decisions in the first set of decisions by an amount of training samples in the set of training samples; and
- combining the leader classifier with the endorser classifier into the combined classifier stage in response to determining that the endorser classifier's accuracy of matching decisions value is higher than the leader classifier accuracy value.

15. The computer program product of claim 13 wherein the information handling system performs additional actions comprising:
- wherein the subsequent leader classifier generates a set of third decisions having a most amount of subsequent correct decisions; and
- selecting the subsequent endorser classifier that generates a set of fourth decisions that match one or more of the third decisions, resulting in a set of subsequent matching decisions, wherein the selection of the endorser classifier is based upon comparing a total amount of the subsequent matching decisions against an amount of the subsequent matching decisions that are correct.

16. The computer program product of claim 15 wherein the information handling system performs additional actions comprising:
- processing the inquiry using the combined classifier stage;
- in response to the leader classifier and the endorser classifier generating one or more same decisions to the inquiry, exiting the pipeline; and
- providing the one or more same decisions as the one or more results to the inquiry.

* * * * *